DELAY LINE CONTROLLED PULSE GENERATOR

Filed Dec. 19, 1963 2 Sheets-Sheet 1

INVENTOR.
THOMAS I. KIRKPATRICK
BY Otto Schmid, Jr.
ATTORNEY

Aug. 9, 1966 T. I. KIRKPATRICK 3,265,975

DELAY LINE CONTROLLED PULSE GENERATOR

Filed Dec. 19, 1963 2 Sheets-Sheet 2

United States Patent Office 3,265,975

Patented August 9, 1966

3,265,975

DELAY LINE CONTROLLED PULSE GENERATOR

Thomas I. Kirkpatrick, Los Gatos, Calif., assignor to International Business Machines Corporation, New York, N.Y., a corporation of New York Filed Dec. 19, 1963, Ser. No. 331,804
8 Claims. (Cl. 328—63)

This invention relates to an electric pulse generating means and, more particularly, to a pulse generating circuit whose output will cease when a malfunction occurs in the circuit.

In applications requiring accurately timed clock pulses, such as the central control clock of a computer for example, damage to the equipment or inaccurate results may result when there is a malfunction in the clock pulse generating circuit. It is therefore the principal object of this invention to provide a pulse generating circuit whose output will automatically cease when there is a malfunction in the clock pulse generating circuit.

It is another object of the invention to provide a clock pulse generating circuit utilizing an impedance discontinuity on a delay line to control the generation of output clock pulse signals.

Prior pulse generating circuits have launched actual pulses down delay lines, these pulses being read out by taps on the delay line. However, these circuits use electronic components in the pulse generating circuits and use the delay lines for timing purposes only. In this type of circuit it is possible for the pulse generator to fail in the ON state and damage the system being clocked.

It is therefore a further object of the invention to provide a clock pulse generating means wherein an output is required from a delay line regenerative loop within a predetermined period to continue the clock output.

According to the invention, there is provided a clock pulse generator wherein an input voltage wave is launched by a monostable means on a delay line toward phased output taps, past a signal cancelling means operable after a predetermined time to cancel the input voltage wave, and a control output means coupled to a coincidence means so that coincidence between said control output and the next of the input voltage waves after the output of the monostable means has stopped causes the monostable means to launch another signal wave on the delay line to continue the clock pulses to the output.

The foregoing and other objects, features and advantages of the invention will be apparent from the following more particular description of a preferred embodiment of the invention, as illustrated in the accompanying drawings.

Figure 3:
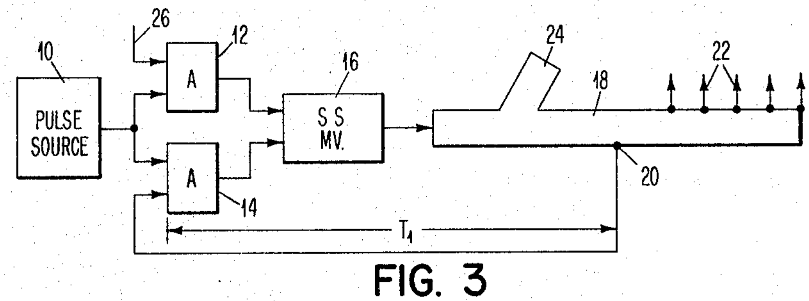
FIG. 3 is a schemmatic block diagram of the pulse generating circuit comprising the invention.

Referring to FIG. 3 of the drawings, there is shown an electric pulse generating means which generates a continuous train of uniformly spaced pulses. A source of pulses 10 is coupled through AND circuit 12 to energize a monostable means 16 which launches a signal of predetermined duration on the signal delay line 18. A plurality of phased output terminals 22 are provided on the delay line 18, and these phased output terminals 22 supply the clock pulses to the system. A signal cancelling means 24 comprising a shorted stub on the delay line 18 is provided. The signal cancelling means 24 functions to reflect a backward wave from the short circuit termination which cancels the forward wave after a predetermined time. A control terminal 20 is provided on the delay line 18 to sample the signal on the delay line at that point. The control output is coupled to AND circuit 14 so that an output is produced from the AND circuit when the control signal input is coincident with a pulse from the pulse generator 10. Thus, it can be seen that unless coincidence is established in the two inputs to AND circuits 14 before the reflection from the short circuit termination cancels the wave on the delay line 18, the clock output will be terminated. This operation will effectively prevent injury to the circuitry or prevent inaccuracies due to a missing clock pulse. The monostable device 16 provides an added degree of reliability which greatly reduces the chance that a spurious noise pulse or an extra clock pulse will be transmitted to the delay line since no additional clock pulses can be generated until the monostable device output goes down. The period of the output of the monostable device is chosen so that the duration of the output is a major fraction of the predetermined time at which the input wave front is cancelled by the reflected wave from the signal cancelling means. Thus, there is a relatively short time between the period of the monostable device output and the predetermined time at which coincidence between the pulse generated output from pulse source 10 and the control output from tap 20 of the delay line 18 can produce an output from the monostable device and thus generate a succeeding clock pulse to be used in the system.

Figure 1:
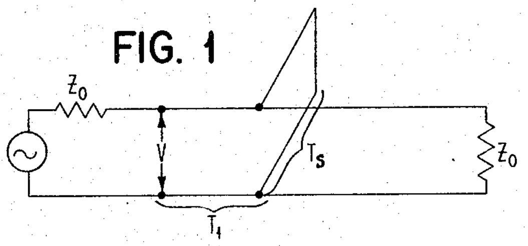
FIG. 1 is a schematic, diagrammatic view of the basic pulse generating delay line of the invention.

The operation of the signal cancelling means can be best explained by reference to FIGS. 1 and 2. The signal cancelling means comprises the stub on the delay line having a short circuit termination. The characteristic impedances of the line and the stub are of a value such that the transmission coefficient is unity for the backward wave reflected from the shorted stub. The shorted stub has a length $T_s$ so that the initial forward wave propagated toward the load is exactly cancelled at a time $2T_s$ after the wave reaches the junction between the delay line and the stub.

Figure 2:
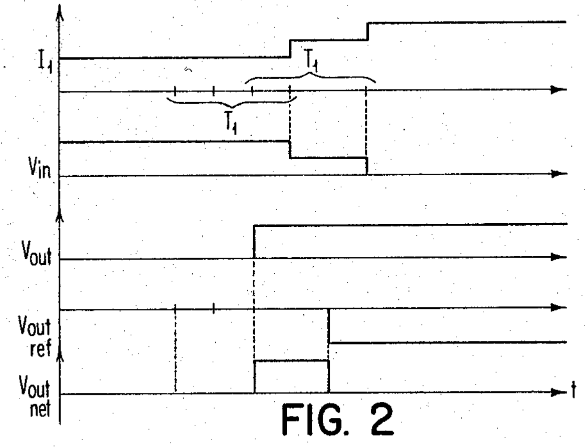
FIG. 2 is a timing diagram showing the voltage and current waveforms of the device shown in FIG. 1.

As shown in FIG. 2, the input voltage goes down to $V/2$ when the wave reaches the junction of the stub and the delay line since the characteristic impedance of the stub is chosen as $Z_0/2$. A time $T_s$ later the wave reaches the short circuit termination stub, and since the stub is shorted the reflection coefficient is $-1$. Thus, a voltage wave of amplitude $-V/2$ is reflected and reaches the delay line at time $T_s$ later. This wave is transmitted in both directions on the delay line so that the input wave is exactly cancelled on the delay line a time $2T_s$ after the input wave reaches the stub.

Figure 4:
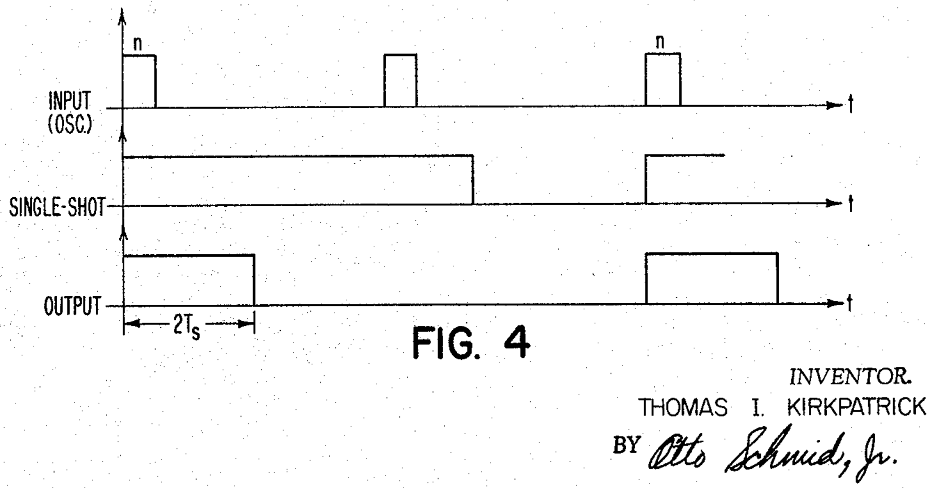
FIG. 4 is a timing diagram showing the voltage waveforms at various points in the circuit of FIG. 3.

Referring to FIG. 3, to start the generator a START signal is applied to the start line 26 long enough to achieve coincidence between the output of pulse generating means 10 in AND circuit 12 so that an output from monostable means 16 is generated to launch the first wave down the delay line 18. The START line then goes down, thereby deconditioning AND circuit 12 so that further wave launching depends upon the coincidence of the control output from the delay line regenerative loop and the input from pulse generator 10 in AND circuit 14. Several phases of clock pulses are frequently required, and these pulses may be obtained from high impedance taps 22 which may be placed at any suitable position on the delay line 18. The separation of the taps relative to the stub length may be adjusted to yield either discrete or overlapped clock pulses. The frequency of pulses generating means 10 may be a multiple $n$ of the basic clock pulse rate as shown in FIG. 4. Thus, this circuit acts as a frequency divider by launching one wave front for every *n* input pulse. The monostable means may be set to turn off just before the *n*th input pulse to limit the possibility of regenerating a spurious pulse. The frequency of the pulse generating means 10 may be set to produce only the pulses marked *n* in FIG. 4, in which case the clock rate would then be the same frequency as the controlling oscillator rate.

Figure 5:
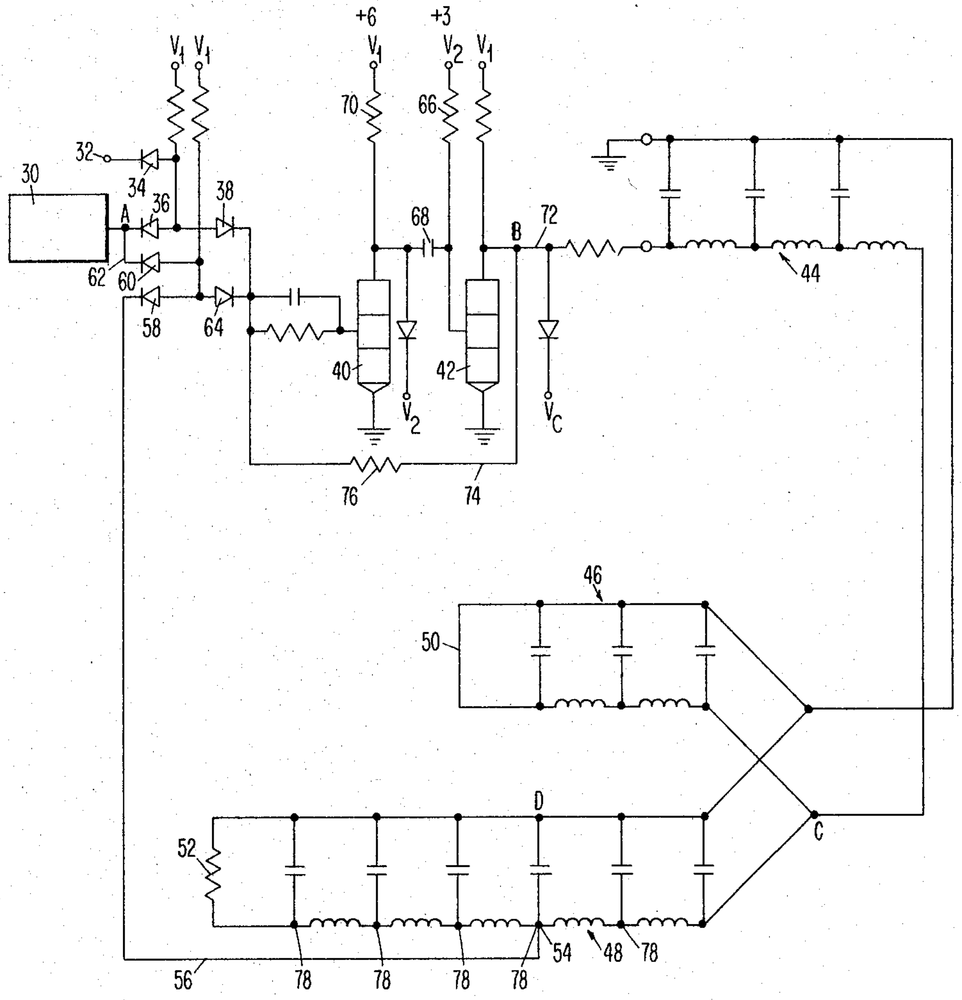
FIG. 5 is a schematic diagram of an embodiment of the pulse generating circuit shown in FIG. 3.
Figure 6:
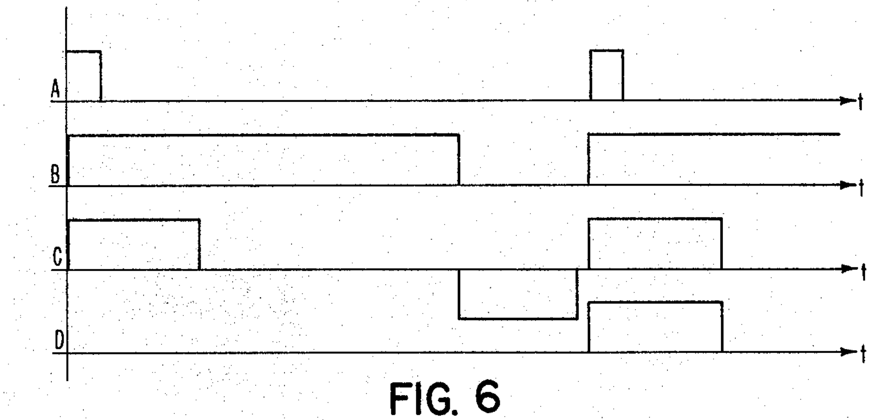
FIG. 6 is a timing diagram showing the voltage waveforms at various points in the circuit of FIG. 5.

A specific embodiment of the invention is shown in FIG. 5. An oscillator 30 is provided to generate a series of substantially square wave voltage pulses such as shown in FIG. 6. A START signal is provided at terminal 32, and coincidence between the START signal and an oscillator pulse in the AND circuit comprising diodes 34 and 36 produces an output which is coupled through OR circuit diode 38 to the input of a single shot multivibrator. The single shot multivibrator comprises transistors 40 and 42 coupled to provide an output having a period defined by the time constant chosen for resistor 66 and capacitor 68. The capacitor is initially charged through resistor 70 and through the emitter-base resistance of transistor 42 since this transistor is normally conducting. The "up" level from the output of OR diode 38 turns on transistor 40, thereby causing the collector voltage to drop. This change is coupled through capacitor 68 to turn off transistor 42, raising the collector output and thereby launching a wave through line 72 down the delay line. Line 74 and resistor 76 provide a feedback path to latch the circuit in this operating condition even though the signal from OR diode 38 is then down. However, when the charge from capacitor 68 discharges to the threshold point for conduction, transistor 42 is turned back on and the resulting lowered output is coupled through the feedback path to turn off transistor 40. When the capacitor 68 has recharged and the negative-going delay line signal generated by the trailing edge of the single shot multivibrator signal has disappeared from the input of the delay line, another period of operation of the single shot multivibrator may be started. The output of the single shot is coupled to the delay line by line 72. The delay line is of the electrical type, and it comprises sections having shunt capacitance and series inductance. The line comprises an input section 44, an output section 48, and a stub section 46 mounted intermediate the ends of the line. The stub section 46 is terminated in a short circuit 50, and the output section 48 is terminated in a resistance 52 equal to the characteristic impedance of the delay line. A plurality of output taps are provided. The output from these taps is coupled through high impedance circuits (not shown) to provide the desired clock pulses of various phase to the utilization device, such as a data processing system for example. The width of the output pulse is equal to twice the time required for the wave to propagate down the stub. For example, if a one microsecond clock pulse is desired, the components for the stub are chosen so that the propagation time is one-half microsecond. A control tap 54 is provided on the delay line, and this output is coupled by line 56 to one input of an AND circuit comprising diodes 58 and 60. Coincidence between the input on line 56 and the output from oscillator 30 on line 62 produces an output through OR diode 64. After the previous output from the single shot has gone down, a further output of the one shot multivibrator will be generated so that another pulse is launched on the delay line. Thus, operation continues in this manner with clock pulses sequentially occurring at the output terminals of the delay line unless a malfunction occurs. If a malfunction does occur, the supply of clock pulses to the output terminals is stopped.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A pulse generating means comprising:
a source of pulses;
wave launching means;
a delay line having an input terminal and first and second output terminals;
means for coupling said wave launching means to the input terminal of said delay line for launching a wave down said delay line;
means for energizing said wave launching means to launch a first wave down said delay line;
impedance discontinuity means on said delay line to cancel the wave after a predetermined time;
a coincidence means;
means for coupling said first output terminal of said delay line to said coincidence means;
means for coupling said source of pulses to said coincidence means;
means for coupling the output of said coincidence means to drive said wave launching means so that coincidence of said first output and the output of said pulse source within a second shorter predetermined time permits another wave to be launched down said delay line; and
means for coupling said second output from said delay line to a utilization device.

2. A pulse generating means comprising:
a source of pulses;
a delay line having an input terminal and first and second output terminals;
means for launching a wave having a predetermined duration;
means for coupling said means for launching a wave to said input terminal of said delay line for launching a wave down said delay line;
means for energizing said means for launching a wave to launch a first wave down said delay line;
impedance discontinuity means on said delay line to cancel the wave after a predetermined time;
a coincidence means;
means for coupling said first output terminal of said delay line to said coincidence means;
means for coupling said source of pulses to said coincidence means;
means for coupling the output of said coincidence means to drive said means for launching a wave so that coincidence of said first output and the output of said pulse source after said predetermined duration permits another wave to be launched down said delay line; and
means for coupling said second output from said delay line to a utilization device.

3. The pulse generating means according to claim 2 wherein said impedance discontinuity means on said delay line comprises a shorted stub.

4. A pulse generating means comprising:
a source of pulses;
a monostable device;
means for gating said pulses to generate an initial output from a monostable device;
a signal delay line;
means for coupling the output of said monostable device to propagate a signal down a signal delay line;
means for cancelling the signal on said signal delay line at a predetermined point after a predetermined time;
a coincidence means;
means for coupling the output from said predetermined point on said delay line to said coincidence means;
means for coupling said source of pulses to said coincidence means;
means for coupling the output of said coincidence means to drive said monostable device to produce an additional output from said monostable device only when coincidence occurs before the end of said predetermined time; and means for coupling an output signal from said delay line to a utilization device.

5. A pulse generating means comprising:

a pulse generator for producing a train of spaced pulses;

a signal delay line for producing a plurality of output pulses;

means for cancelling the signal on said signal delay line after a first predetermined time, said signal cancelling means comprising a stub on said delay line having a reflective termination;

monostable means for generating a signal having a duration of a second shorter predetermined time;

means for coupling said monostable signal to said signal delay line to launch a signal down said delay line;

an output control terminal on said delay line a predetermined distance from said stub;

a coincidence means, means for coupling the output from said control terminal to said coincidence means;

means for coupling said pulse generator to said coincidence means;

means for coupling the output of said coincidence means to drive said monostable means to generate an output from said monostable means only when said control output is coincident with one of said generated pulses after said second predetermined time; and means for coupling said plurality of output pulses from said delay line to a utilization device.

6. A pulse generating means comprising:

a source of pulses;

a monostable device;

coincidence means for gating said pulses to produce an output for a first predetermined time from said monostable device;

a signal delay line;

means for coupling the output of said monostable device to the signal delay line to produce a signal thereon;

means for cancelling said signal after a second longer predetermined time at a predetermined point on said delay line;

means for coupling the output at said predetermined point on said delay line to said coincidence means; means for coupling said source of pulses to said coincidence means to produce an output capable of energizing the monostable device only if coincidence occurs between a pulse from said source and said pulse coupled from said delay line between said first and said second predetermined times; and means for coupling an output sigal from said delay line to a utilization device.

7. A pulse generating means comprising:

a signal delay line having an input and first and second output terminals;

a stub having a reflective termination coupled to said signal delay line intermediate the ends;

a pulse generator;

a coincidence means;

means for coupling said first output from said delay line to an input of said coincidence means;

means for coupling the output of said pulse generating means to a second input of said coincidence means whereby the coincident presence of said inputs produces an output therefrom;

means for coupling the output of said coincidence means to a monostable device to produce an output therefrom;

means for coupling the output of said monostable device to the input of said signal delay line to launch a signal toward the output terminals of said delay line; and means for coupling said second output terminal to a utilization device.

8. A clock pulse generator comprising:

a pulse generator;

a coincidence circuit;

a monostable device for producing a signal having a predetermined period;

means for coupling the output of said coincidence circuit to said monostable device;

a signal delay line, said signal delay line having an input, a plurality of signal output terminals and a control output terminal;

means for coupling the output of said monostable device to the input of said signal delay line;

a signal cancelling means comprising a short circuited stub on said delay line coupled so that the signal on said delay line is cancelled at said control terminal a predetermined time after a signal is propagated at the input of said signal delay line;

means for coupling the output of said pulse generator to one input of said coincidence circuit;

means for coupling the output from said control terminal of said delay line to another terminal of said coincidence circuits so that clock pulses are available at the output terminals of the signal delay line only when a coincidence occurs between the control terminal signal and the pulse generator signal after the predetermined period of said monostable device; and means for coupling the clock pulses from said output terminals of said delay line to a utilization device.

References Cited by the Examiner

UNITED STATES PATENTS

| | | | |
|---|---|---|---|
| 2,212,173 | 8/1940 | Wheeler et al. | 250—36 |
| 2,827,566 | 3/1958 | Lubkin | 250—27 |
| 2,984,789 | 5/1961 | O'Brien | 328—120 |
| 3,089,089 | 5/1963 | Rhodes | 328—40 |

References Cited by the Applicant

UNITED STATES PATENTS

| | | |
|---|---|---|
| 2,718,637 | 9/1955 | Goodwin. |
| 2,750,509 | 6/1956 | Endres. |

JOHN W. HUCKERT, *Primary Examiner.*

R. SANDLER, *Assistant Examiner.*